US011019961B2

(12) United States Patent
Starr (10) Patent No.: US 11,019,961 B2
(45) Date of Patent: Jun. 1, 2021

(54) TOASTER WITH MECHANICAL DELAY SHUT-OFF MECHANISM

(71) Applicant: Hamilton Beach Brands, Inc., Glen Allen, VA (US)

(72) Inventor: William D Starr, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 144 days.

(21) Appl. No.: 16/385,820

(22) Filed: Apr. 16, 2019

(65) Prior Publication Data

US 2020/0329911 A1    Oct. 22, 2020

(51) Int. Cl.
*A47J 27/62* (2006.01)
*A47J 37/08* (2006.01)

(52) U.S. Cl.
CPC ................... *A47J 37/0821* (2013.01)

(58) Field of Classification Search
CPC .... A47J 37/08; A47J 37/0807; A47J 37/0814; A47J 37/0821; A47J 37/0835; A47J 37/0842; A47J 37/085; A47J 37/0857; A47J 37/0871
USPC ..... 99/324, 325, 327, 328, 329 R, 332, 337, 99/385
See application file for complete search history.

(56) References Cited

U.S. PATENT DOCUMENTS

| | | | | |
|---|---|---|---|---|
| 1,900,249 A * | 3/1933 | Miller | ................. | A47J 37/0821 99/391 |
| 1,946,886 A * | 2/1934 | Schramm | ....................... | 99/332 |
| 2,036,178 A * | 3/1936 | Lucia | ................... | H05B 1/0225 99/328 |
| 2,070,290 A * | 2/1937 | Mccullough | ........ | A47J 37/0814 99/333 |
| 2,179,811 A * | 11/1939 | Brosseau | ........... | G05D 23/1923 99/331 |
| 2,182,124 A * | 12/1939 | Guerra | ................ | A47J 37/0814 99/333 |
| RE21,336 E * | 1/1940 | Graham | ......................... | 99/328 |
| 2,271,485 A * | 1/1942 | Koci | .................... | A47J 37/0814 99/329 R |
| 2,284,450 A * | 5/1942 | Sardeson | ............ | A47J 37/0814 99/329 R |
| 2,287,330 A * | 6/1942 | Sardeson | ............ | A47J 37/0821 99/327 |
| 2,294,695 A * | 9/1942 | Sardeson | ............ | A47J 37/0821 99/327 |
| 2,459,170 A * | 1/1949 | Koci | ................... | A47J 37/0807 99/331 |
| 2,485,456 A * | 10/1949 | Poole | .................. | A47J 37/0821 99/333 |

(Continued)

*Primary Examiner* — Hung D Nguyen
(74) *Attorney, Agent, or Firm* — Alexander D. Raring (57) ABSTRACT

A shut-off mechanism for a toaster includes a damper arm pivotally mounted on a frame that includes a damper unit. The damper unit including (a) a cavity in which a viscous fluid is stored, (b) a rotor that resides partially in the cavity and partially outside of the cavity, the viscous fluid resisting rotation of the rotor relative to the cavity, and (c) an engagement member attached to the rotor that engages a track on the frame. The damper arm is movable between a deactivated position and an activated position. An electrical switch configured to engage an electrical contact when the damper arm is in the activated position and to disengage from the electrical contact when the damper arm is in the deactivated position.

20 Claims, 10 Drawing Sheets

(56) References Cited

U.S. PATENT DOCUMENTS

| | | | | |
|---|---|---|---|---|
| 2,499,558 A | * | 3/1950 | Andrews | A47J 37/041 |
| | | | | 99/327 |
| 2,502,655 A | * | 4/1950 | Kitto | A47J 37/0814 |
| | | | | 99/329 R |
| 2,641,175 A | * | 6/1953 | Fichter | A47J 37/0814 |
| | | | | 99/329 R |
| 2,773,441 A | * | 12/1956 | Ireland | A47J 37/0814 |
| | | | | 99/329 R |
| 2,895,404 A | * | 7/1959 | Ireland | A47J 37/0814 |
| | | | | 99/329 R |
| 3,684,860 A | * | 8/1972 | Snyder | F24C 7/087 |
| | | | | 99/329 R |
| 4,065,658 A | * | 12/1977 | Keim | A47J 37/0835 |
| | | | | 219/386 |
| 4,178,498 A | * | 12/1979 | Snyder | A47J 37/0629 |
| | | | | 200/17 A |
| 4,189,632 A | * | 2/1980 | Swanson | A47J 37/0623 |
| | | | | 99/385 |
| 4,345,513 A | * | 8/1982 | Holt | A47J 37/0857 |
| | | | | 99/327 |
| 4,427,876 A | * | 1/1984 | Bonacorsi | A47J 37/0623 |
| | | | | 99/328 |
| 5,889,259 A | * | 3/1999 | Krasznai | A47J 37/0835 |
| | | | | 99/332 |
| 6,129,007 A | * | 10/2000 | Chan | A47J 37/0814 |
| | | | | 99/332 |
| 6,240,834 B1 | * | 6/2001 | Chen | A47J 37/0842 |
| | | | | 99/327 |
| 6,350,970 B1 | * | 2/2002 | Huggler | A47J 37/0842 |
| | | | | 99/338 |
| 6,559,423 B2 | * | 5/2003 | Nguyen | A47J 37/0814 |
| | | | | 99/332 |

\* cited by examiner

TOASTER WITH MECHANICAL DELAY SHUT-OFF MECHANISM

FILED OF THE INVENTION

The present invention relates generally to appliances, and more particularly to toasters.

BACKGROUND

Pop-up toasters are well known. Conventional pop-up toasters generally have at least one spring-loaded bread tray contained within a housing. The bread tray holds a bread product (e.g., a slice of bread, one-half of an English muffin or bagel, etc.) or other similar food product while one or more heating elements within the housing apply heat to the bread product, thereby toasting the bread product. The bread tray is movable between a raised position and a lowered position, and is biased toward the raised position. In the raised position, the bread product may be inserted into the bread tray. Typically, when in the raised position, the bread product protrudes at least partially from the top of the toaster.

After the bread product is inserted into the bread tray, a user lowers the bread tray to the lowered position via a lifter knob or handle. The lifter knob is typically external to the housing and affixed to the bread tray through a lifter arm and lifter bracket. When the bread tray is lowered, an electrical circuit is completed which starts a toast cycle and applies power to the heating elements and an electromagnet. The energized electromagnet attracts a metal plate or beam affixed to the lifter bracket, thereby retaining the bread tray in the lowered position.

When the toast cycle is complete, the electromagnet is de-energized, thereby releasing the bread tray. Because the bread tray is biased toward the raised position, it returns to the raised position. As the bread tray leaves the lowered position, the electrical circuit is broken and power is removed from the heating elements. Once in the raised position, the now-toasted bread (i.e., toast) protrudes at least partially from the top of the toaster and may be removed from the toaster.

There are regulatory agencies, such as Underwriters' Laboratory (UL), that regulate certain features of toasters. For example, UL 1026, Sixth Edition (updated Aug. 24, 2018), requires that toasters have a shut-off mechanism that assures that power is not supplied to the heating elements beyond a period having a duration that is 60 seconds longer than the maximum toast cycle. Thus, toaster manufacturers should provide a mechanism that causes the toaster to meet this standard.

SUMMARY

As a first aspect, embodiments of the invention are directed to a shut-off mechanism for a toaster. The shut-off mechanism comprises: a frame having a base, a vertical wall and a track with opposed first and second ends; a damper arm pivotally mounted on the frame that includes a damper unit attached to one end of the damper arm, the damper unit including (a) a cavity in which a viscous fluid is stored, (b) a rotor that resides partially in the cavity and partially outside of the cavity, the viscous fluid resisting rotation of the rotor relative to the cavity, and (c) an engagement member attached to the rotor that engages the track on the frame, wherein the damper arm is movable between a deactivated position, in which the damper unit is adjacent the first end of the track, and an activated position, in which the damper unit is adjacent the second end of the track; a first biasing member that biases the damper arm toward the deactivated position; a cocking member pivotally attached to the frame and positioned between the damper arm and the vertical wall of the frame, the cocking member movable between a toasting position and a rest position, wherein movement of the cocking member from the rest position to the toasting position moves the damper arm from the deactivated position to the activated position; and an electrical switch positioned and configured to engage an electrical contact when the damper arm is in the activated position and to disengage from the electrical contact when the damper arm is in the deactivated position.

As a second aspect, embodiments of the invention are directed to a toaster, comprising: a housing with at least one bread slot; a heating element positioned within the housing to toast bread in the at least one bread slot; an electrical system connected with the heating element; a bread-lifting carriage mounted to the housing; a shut-off mechanism, and an electrical switch connected with the electrical system. The shut-off mechanism comprises: a frame; a rotary damper assembly pivotally mounted relative the frame that includes a damper member and a damper unit including (a) a cavity in which a viscous fluid is stored, (b) a rotary member that resides partially in the cavity and partially outside of the cavity, the viscous fluid resisting rotation of the rotor relative to the cavity, and (c) an engagement member selectively rotatable relative to the rotary member that engages the frame, wherein the damper member is movable between a deactivated position and an activated position relative to the frame; a first biasing member that biases the damper arm toward the deactivated position; a cocking member mounted to the frame, the cocking member movable between rest and toasting positions; and a second biasing member that biases the cocking member toward the rest position. The carriage includes a member that engages the cocking member, such that lowering of the carriage drives the cocking member to the toasting position. The cocking member drives the damper assembly to the activated position as the cocking member moves from the rest position to the toasting position, but wherein the cocking member is free to return to the rest position independently of the damper assembly. The electrical switch is positioned and configured to engage an electrical contact when the damper member is in the activated position and to disengage from the electrical contact when the damper member is in the deactivated position.

As a third aspect, embodiments of the invention are directed to a toaster, comprising: a housing with at least one bread slot; a heating element positioned within the housing to toast bread in the at least one bread slot; an electrical system connected with the heating element; a bread-lifting carriage mounted to the housing; and a shut-off mechanism. The shut-off mechanism comprises: a frame; a rotary damper assembly pivotally mounted relative the frame that includes a damper member and a damper unit including (a) a cavity in which a viscous fluid is stored, (b) a rotary member that resides partially in the cavity and partially outside of the cavity, the viscous fluid resisting rotation of the rotor relative to the cavity, and (c) a pinion selectively rotatable relative to the rotary member that engages teeth in the frame, wherein the damper member is movable between a deactivated position and an activated position relative to the frame; a first spring that biases the damper arm toward the deactivated position; a cocking lever mounted to the frame, the cocking lever movable between rest and toasting positions; and a second spring that biases the cocking lever toward the rest position. The carriage includes a member that engages the cocking lever, such that lowering of the carriage drives the cocking lever to the toasting position. The cocking lever drives the damper assembly to the activated position as the cocking lever moves from the rest position to the toasting position, but wherein the cocking lever is free to return to the rest position independently of the damper assembly. The toaster further comprises an electrical switch connected with the electrical system positioned and configured to engage an electrical contact when the damper member is in the activated position and to disengage from the electrical contact when the damper member is in the deactivated position.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1:
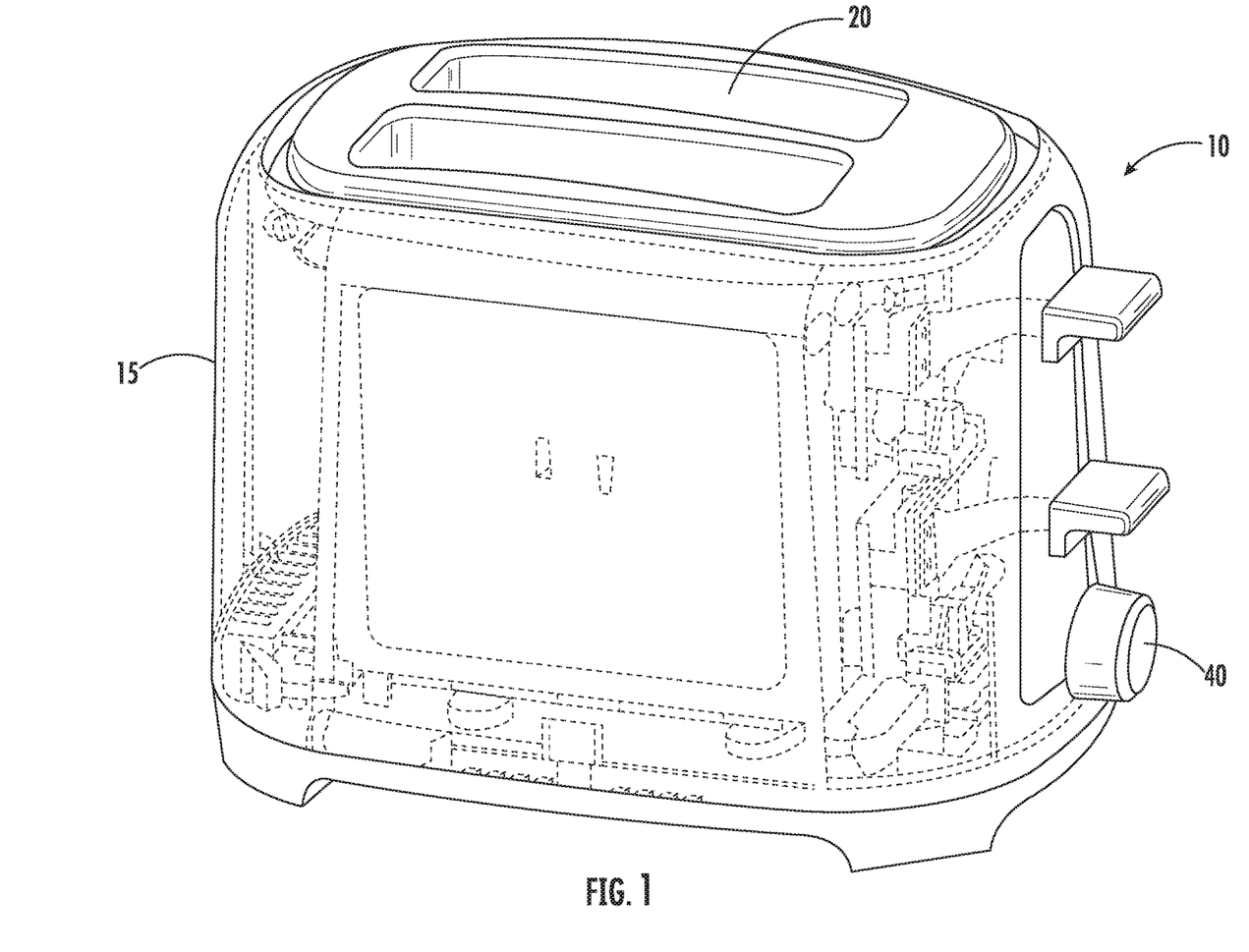
FIG. 1 is a perspective view of a toaster according to embodiments of the invention, with the handle shown in both raised and lowered positions.
Figure 2:
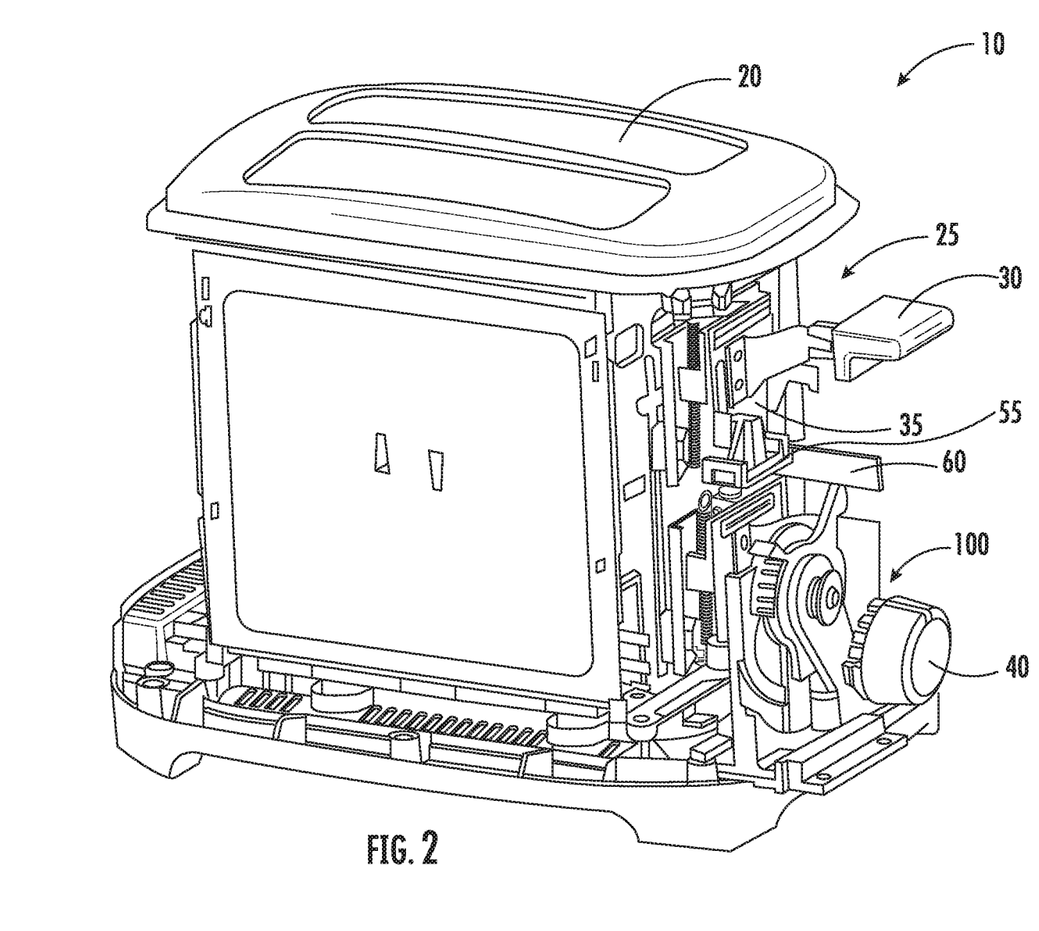
FIG. 2 is a perspective view of the toaster of FIG. 1 with the housing removed.
Figure 3:
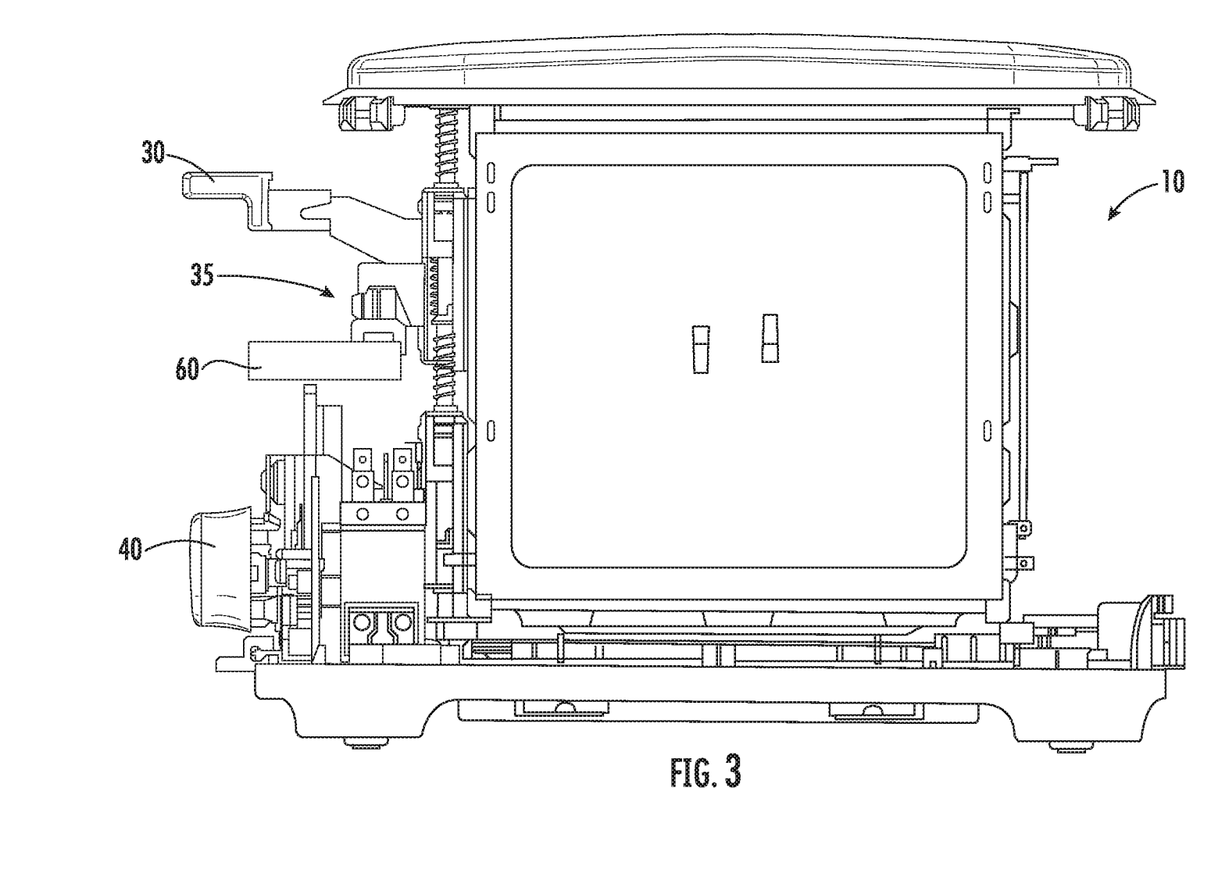
FIG. 3 is a front view of the toaster of FIG. 1 with housing removed.

Referring now to the drawings, a toaster, designated broadly at 10, is shown in FIGS. 1 and 2. The toaster 10 comprises a housing 15 having one or more slots 20 dimensioned to receive consumable food products, e.g., generally planar-shaped food products such as bread, bagels, and pre-filled pastries. A user may insert one or more consumable food products into a respective slot 20 of the toaster 10, and specifically into a bread lifting mechanism 25 (also referred to herein as a bread lifter) within the housing 15. The bread lifter 25 has a mechanical connection and/or linkage to a carriage 35 which has a handle 30 at an end distal from the bread lifter 25. One or more user controls 40 may be present on an exterior of the housing 15. Although the user control 40 is illustrated in FIG. 1 as a control knob, it is within the scope of the present disclosure that other input controls may be present, in addition to or in the alternative to the illustrated control knob. For example, keys, buttons, switches, or other user controls 40 may be present and may control various features and functions of the toaster 10.

During operation of the toaster 10, the bread lifter 25 is initially in a raised position, and a food product inserted into a slot 20 may extend partially beyond an upper surface of the housing 15 of the toaster 10 and as such may be partially exposed and hand-graspable. After insertion of the food product into the slots 20, the user may press down on the handle 30 thereby initiating a toasting operation. The force of the user pressing down on the handle 30 results in a corresponding downward motion of the bread lifter 25. The food product and the bread lifter 25 thereby descend to a lowered position within the main body of the toaster 10. The bread lifter 25, carriage 35, and/or handle 30, may held in a lowered position by a mechanical, mechano-electrical, and/or electrical device, such as a latch, solenoid, and/or electromagnet for the duration of the toasting operation. In the illustrated embodiment, the carriage 35 is maintained in the lowered position via an electromagnet (not shown) that attracts a latch plate 55 attached to the carriage 35, wherein deactivation of the electromagnet causes the carriage 35 to rise to the raised position.

As described above, regulatory agencies (such as UL) require that toasters include a shut-off mechanism that assures that power is not supplied to the heating elements of the toaster beyond a period having a duration that is 60 seconds longer than the maximum toast cycle. The shut-off mechanism 100 is included in the toaster 10 and is shown in FIG. 2 mounted in the toaster 10 adjacent the carriage 35 and handle 30. A beam 60 that is attached to and moves with the carriage 35 engages the shut-off mechanism 100 in the manner described below.

Referring now to FIGS. 4-8, the shut-off mechanism 100 includes a frame 102, a damper arm 130 that includes a damper unit 140, a cocking lever 160, a push pawl 170, and a leaf switch 190. These components are described in greater detail below.

Figure 4:
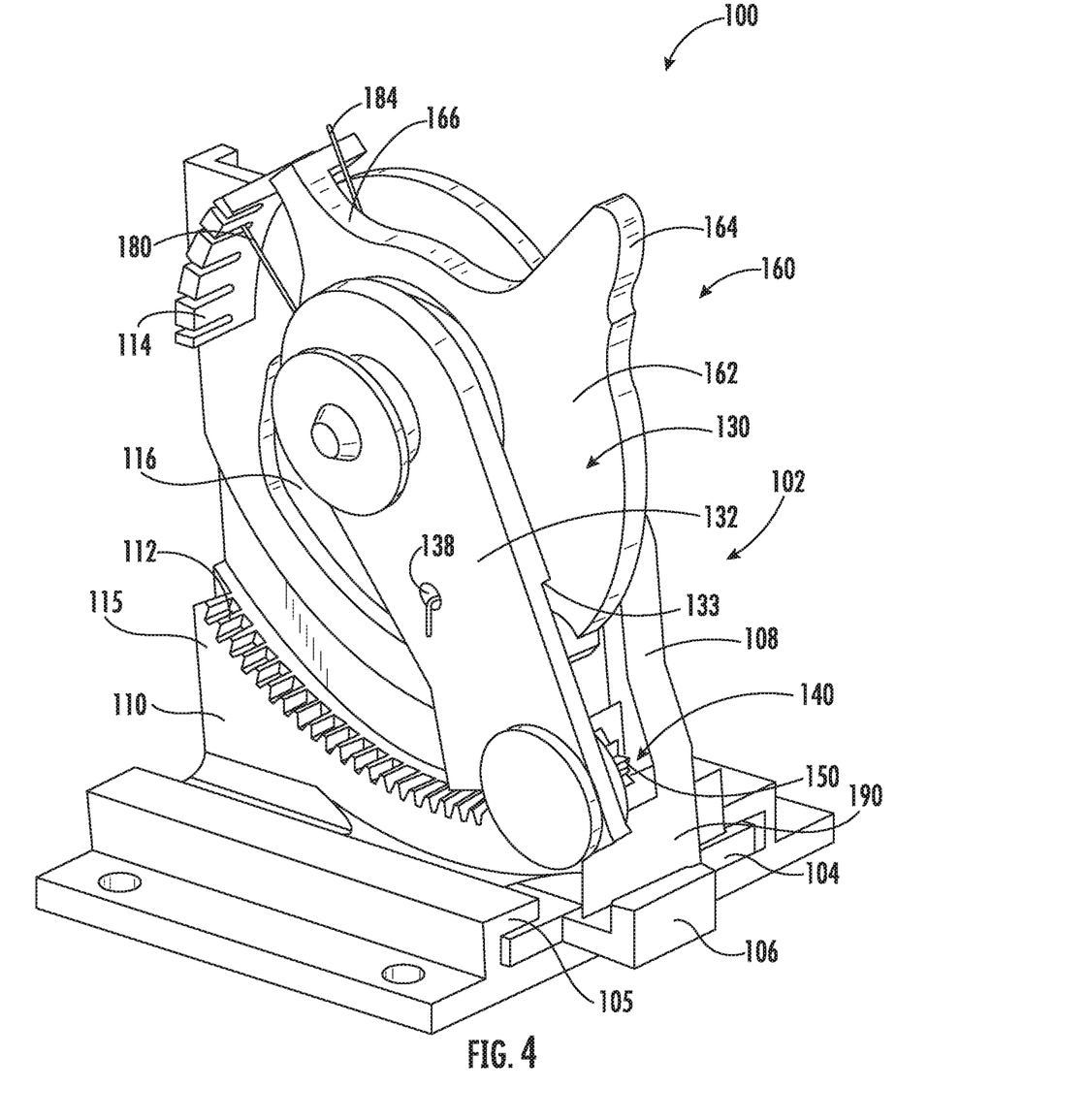
FIG. 4 is a front perspective view of the delay switch mechanism of the toaster of FIG. 1.
Figure 5:
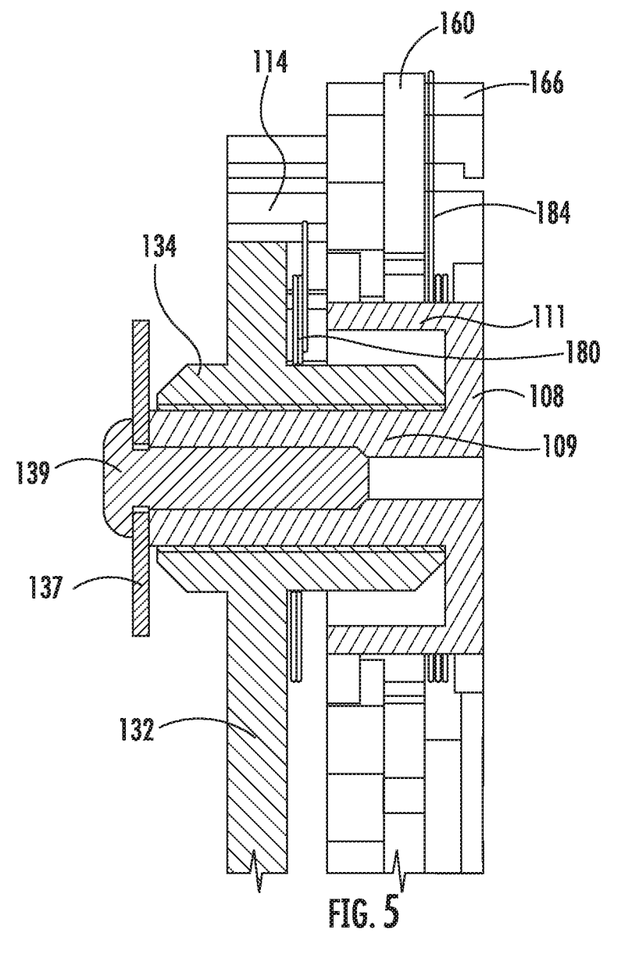
FIG. 5 is a partial side section view of the delay switch mechanism of the toaster of FIG. 1.
Figure 8:
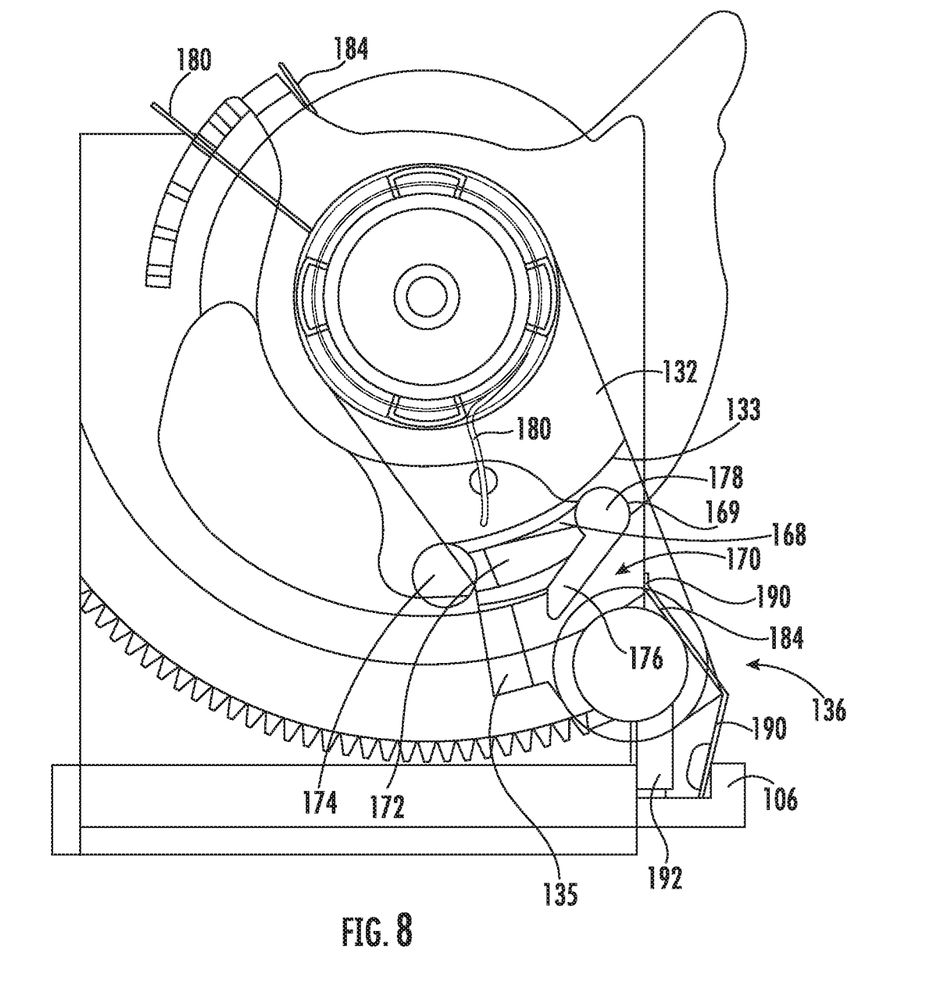
FIG. 8 is a side view of the delay switch mechanism of FIG. 5 shown in the deactivated position.
Figure 9:
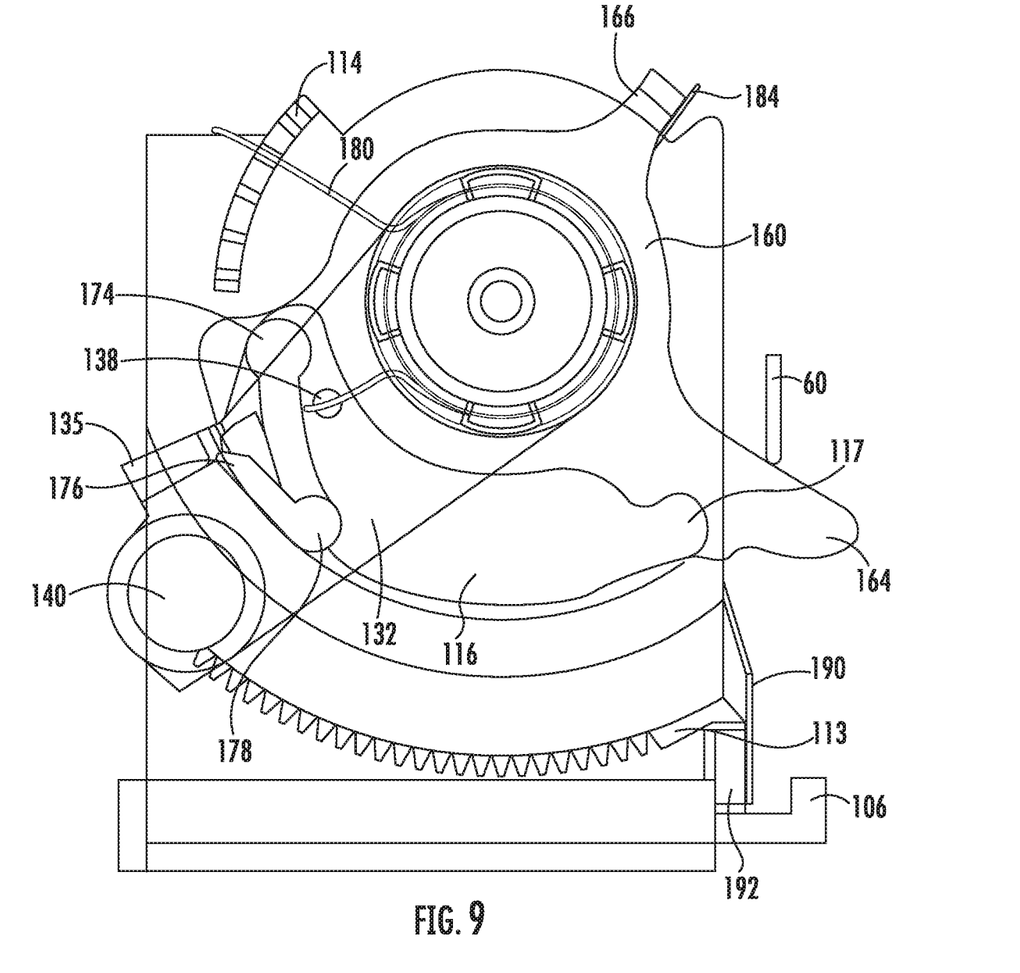
FIG. 9 is a side view of the delay switch mechanism of FIG. 5 shown in the activated position.

Referring first to FIGS. 4, 5 and 8, the frame 102 has a base 104 that is mounted to the floor of the housing 15 via two L-shaped flanges 105. A stop 106 extends from one end of the base 104. A wall 108 with a rounded top edge rises vertically from the base 104. A damper arm boss 109 extends from a central location on the wall 108, and a lower, wider cocking lever boss 111 encircles the damper arm boss 109. A ledge 110 extends from the base to a toothed arcuate upper edge 115 that has teeth 112. A small untoothed landing 113 is adjacent one end of the teeth 112. A set of tines 114 extends horizontally from the upper end of the wall 108 adjacent its upper edge. A pawl recess 116 is positioned generally between the teeth 112 and the boss 109 and includes a lobe 117 (visible in FIG. 9) at one end.

Referring now to FIGS. 4, 5 and 8, the damper arm 130 has a main body 132 with a journal 134 near one end that fits over the damper arm boss 109 of the frame 102 but within the cocking lever boss 111. At the opposite end, the damper arm includes a pocket 136. A shoulder 133 extends across the main body 132 between the pocket 136 and the journal 134. A tab 135 is located adjacent the pocket 136 and extends toward the wall 108 of the frame 102. A hole 138 is located between the journal 134 and the pocket 136. A washer 137 and screw 139 are inserted into the damper arm boss 109 to fasten the damper arm 130 in place and provide a pivot point for the damper arm 130.

Figure 6:
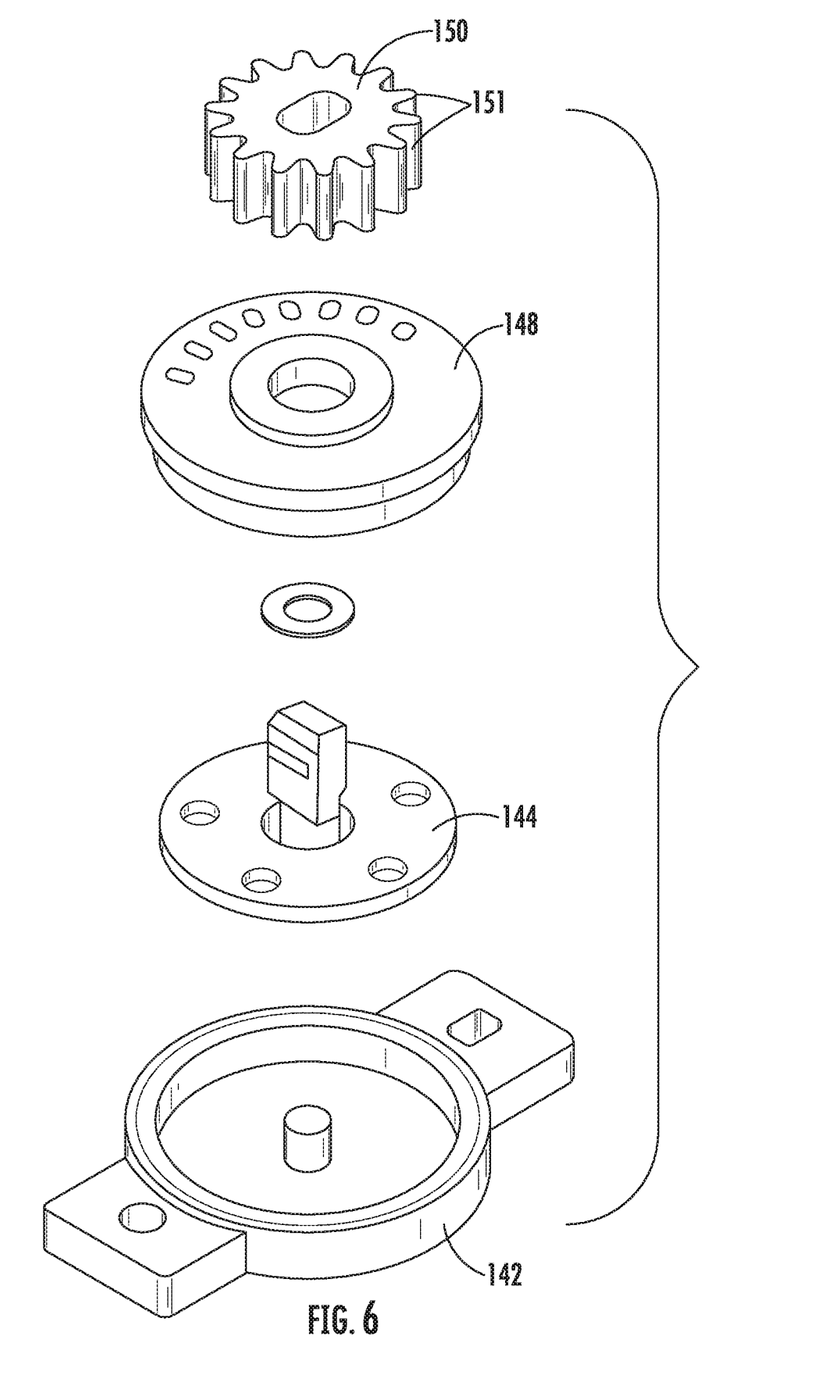
FIG. 6 is an exploded view of the viscous damper unit of the delay switch mechanism of FIG. 5.
Figure 7:
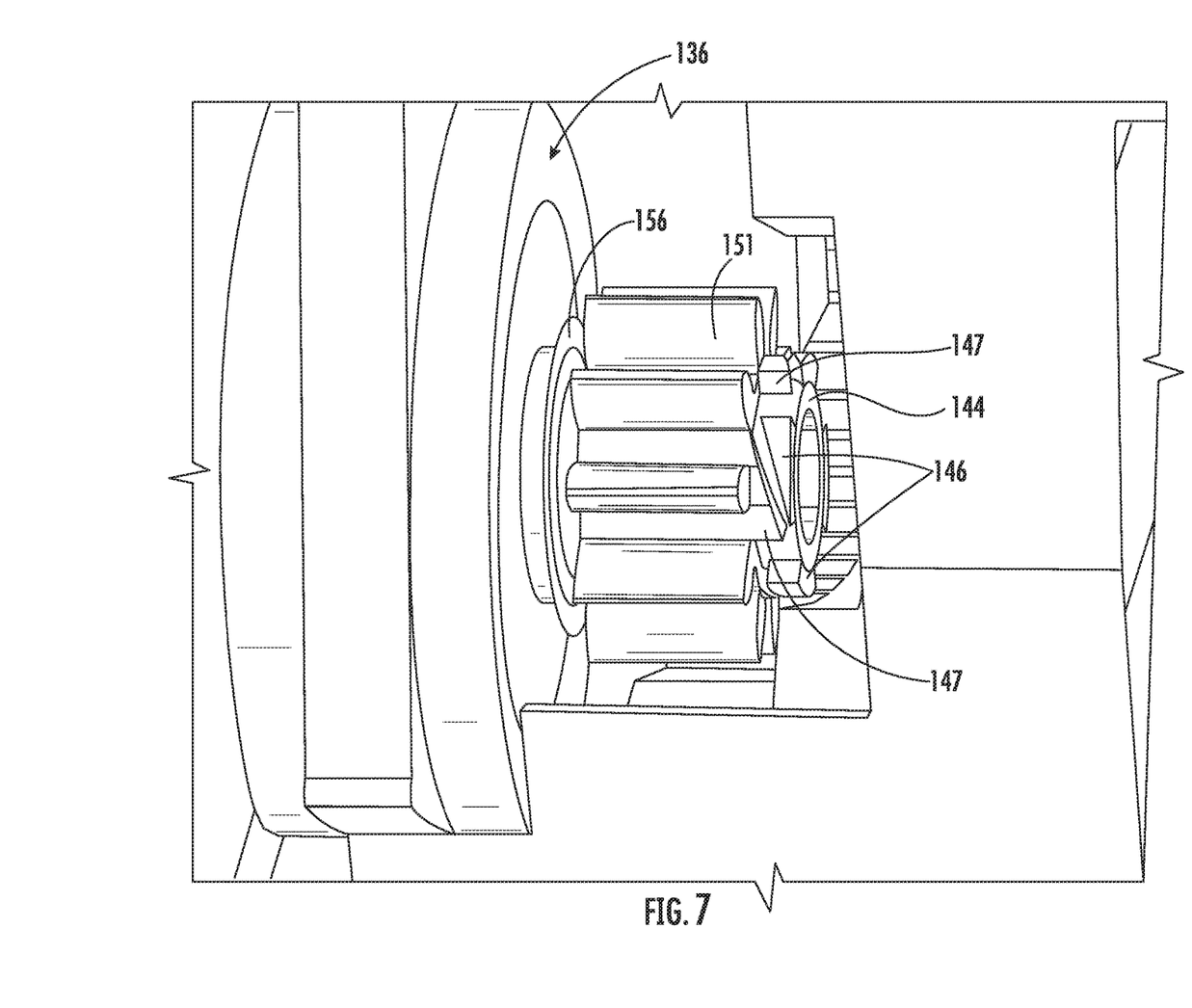
FIG. 7 is a greatly enlarged front perspective view of the viscous damper unit in place in the delay switch mechanism of FIG. 4.

The damper unit 140 is mounted in the pocket 136 of the damper arm 130. As seen in FIG. 6, the damper unit 140 includes a body 142, a rotor 144, a cover 148 that covers the body 142 and captures the rotor 144, and a pinion 150 with teeth 151 that are configured to mesh with the teeth 112 on the frame 102. A washer spring 156 is positioned between the pinion 150 and the cover 148 (visible in FIG. 7). As seen in FIG. 7, the rotor 144 has ratchet-style teeth 146 on its free end that engage with ramps 147 on the pinion 150 to prevent rotation of the pinion 150 relative to the rotor 144 in one rotative direction but permit rotation in the opposite rotative direction.

The cavity formed by the body 142 and the cover 148 (in which the base of the rotor 144 resides) is filled with a viscous fluid, such as silicon oil, that resists rotation of the rotor 144 relative to the body 142 and cover 148 in a predictable manner. Thus, the application of a predetermined torque to the rotor 144 (e.g., via the pinion 150 when relative rotation of the pinion 150 and rotor 144 is prevented) causes the rotor 144 to resistively rotate at a predictable rate. In some embodiments, the viscosity of the viscous fluid is between about 10,000 and 50,000 centiPoise.

Referring now to FIGS. 4, 5 and 8, the cocking lever 160 has a main body 162 with a hole that fits over the cocking lever boss 111 of the frame 102. A beam-engaging finger 164 extends upwardly from one side of the upper end of the main body 162. A spring-engaging finger 166 extends horizontally from the other side of the upper end of the main body 162. The main body 162 includes a recess 168 with a semicircular notch 169.

The push pawl 170 (visible in FIGS. 8-10) has an elongate base 172 with a knob 174 that fits within the pawl recess 116 of the frame 102. The push pawl 170 also includes a finger 176 that resides outside the recess 116 and extends at an angle relative to the base 172. In some embodiments, the finger 176 extends below the lower edge of the recess 116 a distance of between about 2 and 3 mm. As the base 172 of the push pawl 170 fits in the recess 116 in the wall 108 of the frame 102, the vertex 178 of the base 172 fits in the notch 169 and the finger 176 fits within the recess 168 of the cocking lever 160 and below the shoulder 133 of the damper arm 130.

Referring to FIGS. 4 and 5, a spring 180 is coiled around the journal 134. One end of the spring 180 is received between two of the tines 114 in the frame 102. The other end of the spring 180 is received in the hole 138 in the damper arm 130. The spring 180 is arranged to bias the damper arm 130 to rotate toward the stop 106 of the frame 102 (i.e., counterclockwise from the vantage point of FIGS. 8-10). The presence of multiple tines 114 permits the end of the spring 180 to be positioned in multiple locations, which can enable the spring force on the damper arm 130 to be adjusted. A second spring 184 is coiled around the cocking lever boss 111, with one end resting adjacent the spring-engaging finger 166 of the cocking lever 160 and the opposite end engaging a vertical stop (not shown) on the wall 108 of the frame 102. The spring 184 is arranged to bias the spring-engaging finger 166 of the cocking lever 160 toward the tines 114 of the frame 102 (i.e., counterclockwise from the vantage point of FIGS. 8-10). A leaf switch 190 is mounted to the edge of the wall 108 of the frame 102 and extends downwardly between the wall 108 and the stop 106. A contact 192 is mounted in the gap between the leaf switch 190 and the wall 108. The switch 190 and contact 192 are electrically connected with the electrical system of the toaster 10.

In operation, prior to toasting, the shut-off mechanism 100 begins in the position shown in FIG. 8. As can be seen therein, the cocking lever 160 is in a rest position and is oriented such that the beam-engaging finger 164 extends upwardly and the spring-engaging finger 166 is biased by the spring 184 against the edge of the wall 108 of the frame 102 adjacent the tines 114. The damper arm 130 is biased by the spring 180 to a position in which the damper unit 140 is above the landing 113 and the edge of the main body 132 deflects the leaf switch 190 away from the contact 192. The push pawl 170 is positioned with its vertex 178 in the lobe 117 of the recess 116 of the wall 108 of the frame 102 and in the notch 169 of the recess 168 of the cocking lever 160, with the finger 176 extending below the recess 116 and in position to engage the tab 135 of the damper arm 130. The beam 60 of the toaster carriage 35 is in a raised position.

As the handle 30 of the toaster 10 is depressed to initiate the toasting process, the latch plate 55 of the carriage 35 descends also. The electromagnet discussed above attracts the latch plate 55 to hold the carriage 35 in its lowered position. Also, depressing the handle to lower the carriage 35 causes the beam 60 to descend. The beam 60 contacts the beam engaging finger 164 of the cocking lever 160, thereby driving it downwardly and causing the cocking lever 160 to rotate about the boss 111 (clockwise from the vantage point of FIGS. 8 and 9) to a toasting position. Rotation of the cocking lever 160 forces the push pawl 170 along the lower edge of the recess 116 of the wall 108. The finger 176 of the push pawl 170 engages the tab 135 of the damper arm 130 and induces the damper arm 130 to rotate about the boss 109 (also clockwise from the vantage point of FIGS. 8 and 9). As the damper arm 130 rotates, the pinion 150 engages the teeth 112 of the frame 102 and rotates relative to the rotor 144 of the damper unit 140 (clockwise from the vantage point of FIGS. 8 and 9). Rotation of the pinion 150 relative to the rotor 144 is permitted due to the configuration of the teeth 146 of the rotor 144 and ramps 147 of the pinion 150. As the damper arm 140 and cocking lever 160 near the end of their movements, the shape of the recess 116 of the frame forces the knob 174 of the push pawl 170 radially inwardly, which rotates the push pawl 170 about the vertex 178 so that the finger 176 of the push pawl 170 disengages from the tab 135 on the damper arm 130, thereby ceasing rotation of the damper arm 130. The positions of the various components of the shut-off mechanism 100 when the carriage of the toaster 35 is in the lowered position can be seen in FIG. 9.

As toasting occurs, the damper arm 130 and cocking lever 160 begin to return to their original positions. As noted above, the damper arm 130 is biased by the spring 180 toward its original position. However, the presence of the washer spring 156 forces the pinion 150 axially along the rotor 144 to a position in which the teeth 146 of the rotor 144 engage the ramps 147 on the pinion 150 to prevent the pinion 150 from rotating relative to the rotor 144 (this can be visualized from FIG. 7). Thus, the torque generated on the pinion 150 by the movement of the damper arm 140 causes the rotor 144 and pinion 150 to rotate together relative to the body 142 and cover 148 of the damper unit 140. This rotation is resisted by the viscous fluid in the damper unit 140, such that rotation proceeds only at a slow, steady rate as permitted by the viscous fluid.

As a result of the controlled rotation of the pinion 150, the damper arm 130 rotates back toward the leaf switch 190 (i.e., counterclockwise from the vantage point of FIGS. 9 and 10) in a slow, controlled manner. The damper arm 130 continues to rotate until it reaches the landing 113, at which point it engages the leaf switch 190 and causes it to deflect away from the contact 192.

In the event of normal operation of the toaster 10, the controls of the toaster 10 release the latch plate 55 when the toasting process is complete by de-energizing the electromagnet. This enables the carriage 35 to rise. As a result, the beam 60 disengages from the cocking lever 160 and rises to its original position. Disengagement of the beam 60 from the cocking lever 160 allows the cocking lever 160 (driven by the spring 184) to rotate about the boss 111 (counterclockwise from the vantage point of FIGS. 9 and 10). Rotation of the cocking lever 160 draws the push pawl 170 along the lower edge of the recess 116 and (eventually) into the lobe 117. During normal operation, the damper arm 130 will not have completed its travel along the teeth 112 at the time the beam 60 rises. The shape of the recess 116 enables the push pawl 170 to pivot about its vertex 178 within the notch 169 in the cocking lever 160 in order to move past the pinion 150 to its original position.

Also, during normal operation, rising of the latch plate 55 deactivates the heating elements of the toaster 10. In this instance, when the damper arm 130 reaches the leaf switch 190 and deflects it away from the contact 192, the creation of the open circuit has no impact, as the heating elements of the toaster 10 are already de-energized.

Figure 10:
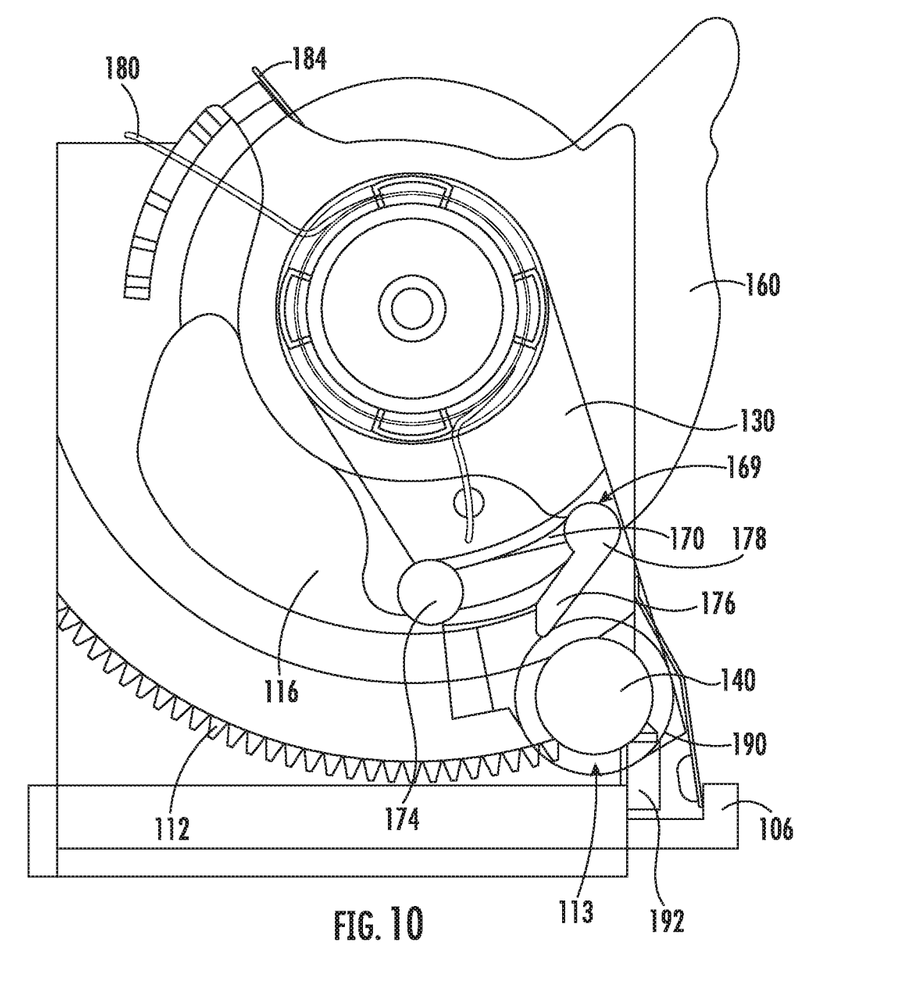
FIG. 10 is a side view of the delay switch mechanism of FIG. 5 shown in the deactivated position.

In contrast, in the event that the carriage 35 (and in turn the latch plate 55 and the beam 60) remains in the lowered position, such that the heating elements remain activated, engagement and deflection of the leaf switch 190 with the damper arm 130 creates an open circuit as the leaf switch 190 moves out of engagement with the contact 192. The presence of the open circuit assures that the heating elements are de-energized. In some embodiments, the travel time of the damper arm 130 from the position of FIG. 9 to the position of FIG. 10 is selected to be between about 3 and 6 minutes, with a time period of between about 4 and 5 minutes being desirable for many toasters. This travel time may correspond to a duration that exceeds the toasting time of the maximum toasting setting by a predetermined period (e.g., exceeding maximum toasting by 30 seconds, 45 seconds, 60 seconds, 90 seconds, or the like). The travel time of the damper arm 130 may depend on the selection of the viscous fluid of the damper unit 140, the force of the spring 180, the arc length defined by the teeth 112, the pre-load position of the spring 180 in the tines 114, and/or the position of the leaf switch 190.

Those of skill in this art will appreciate that the toaster 10 may take other forms. For example, the configuration of the toaster 10 itself may vary: the toaster may include more or fewer slots for toasting, they may be arranged differently, and the controls 40 may be configured differently (both electrically and mechanically). Other variations are also possible.

In addition, the shut-off mechanism 100 may be configured differently. As specific examples, the pinion may be replaced with a different rotary engagement member (such as a friction wheel) that engages some other variety of track (e.g., a non-toothed surface). The damper arm 130 may include a damper member having a different configuration, and in some embodiments the damper unit 140 may share the pivot axis of the cocking lever and/or the damper arm. Alternatively, the pocket 136 of the damper arm 130 may serve as the body of the damper unit 140. The teeth 146 and ramps 147 of the damper unit 140 may be replaced with other selective rotation features that prevent rotation of the pinion or other rotary engagement member in one direction but permit rotation in the opposite direction.

Further, the cocking lever 160 may be replaced with a cocking member of a different configuration that can drive the damper arm 130 toward the activated position but can rotate back to the rest position independently of the damper arm 140. Other variations will be apparent to those of skill in this art.

Also, in some embodiments, the switch 190 and/or contact 192 may be mounted to structures other than the frame 102, such as the housing 15. The springs 180, 184 may have different configurations, or may be a different variety of biasing member (such as an elastic band or the like).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of That which is claimed is:

1. A shut-off mechanism for a toaster, comprising:
a frame having a base, a vertical wall and a track with opposed first and second ends;
a damper arm pivotally mounted on the frame that includes a damper unit attached to one end of the damper arm, the damper unit including (a) a cavity in which a viscous fluid is stored, (b) a rotor that resides partially in the cavity and partially outside of the cavity, the viscous fluid resisting rotation of the rotor relative to the cavity, and (c) an engagement member attached to the rotor that engages the track on the frame, wherein the damper arm is movable between a deactivated position, in which the damper unit is adjacent the first end of the track, and an activated position, in which the damper unit is adjacent the second end of the track;
a first biasing member that biases the damper arm toward the deactivated position;
a cocking member pivotally attached to the frame and positioned between the damper arm and the vertical wall of the frame, the cocking member movable between a toasting position and a rest position, wherein movement of the cocking member from the rest position to the toasting position moves the damper arm from the deactivated position to the activated position; and
an electrical switch positioned and configured to engage an electrical contact when the damper arm is in the activated position and to disengage from the electrical contact when the damper arm is in the deactivated position.

2. The shut-off mechanism defined in claim 1, further comprising a push pawl engaging and moveable with the cocking member and positioned between the damper arm and the wall of the frame, the push pawl engaging the damper arm to drive the damper arm from the deactivated position to the activated position as the cocking lever moves from the rest position to the toasting position.

3. The shut-off mechanism defined in claim 2, wherein the vertical wall includes a recess, and wherein the push pawl includes a main body and a finger, the main body being received in the recess in the vertical wall, and wherein the finger engages the damper arm as the cocking member drives the damper arm from the deactivated position to the activated position.

4. The shut-off mechanism defined in claim 3, wherein the recess includes a cammed edge that forces the push pawl to rotate relative to the cocking lever so that the finger disengages from the damper arm as the damper arm approaches the activated position.

5. The shut-off mechanism defined in claim 3, wherein the first biasing member comprises a spring mounted to the frame and to the damper arm.

6. The shut-off mechanism defined in claim 1, further comprising a second biasing member that biases the cocking member toward the rest position.

7. The shut-off mechanism defined in claim 6, wherein the second biasing member comprises a spring mounted to the frame and to the cocking member.

8. The shut-off mechanism defined in claim 1, wherein the switch is a leaf switch mounted to the vertical wall.

9. The shut-off mechanism defined in claim 1, wherein the damper unit engagement member and the rotor include engagement features that enable the engagement member to rotate relative to the rotor in a first rotative direction but substantially prevent rotation relative to the rotor in a second, opposite rotative direction.

10. The shut-off mechanism defined in claim 1, wherein the track includes first teeth, and wherein the engagement member of the damper unit includes second teeth that mesh with the first teeth.

11. A toaster, comprising:
a housing with at least one bread slot;
a heating element positioned within the housing to toast bread in the at least one bread slot;
an electrical system connected with the heating element;
a bread-lifting carriage mounted to the housing; and
a shut-off mechanism, comprising:
a frame;
a rotary damper assembly pivotally mounted relative the frame that includes a damper member and a damper unit including (a) a cavity in which a viscous fluid is stored, (b) a rotary member that resides partially in the cavity and partially outside of the cavity, the viscous fluid resisting rotation of the rotor relative to the cavity, and (c) an engagement member selectively rotatable relative to the rotary member that engages the frame, wherein the damper member is movable between a deactivated position and an activated position relative to the frame;
a first biasing member that biases the damper arm toward the deactivated position;
a cocking member mounted to the frame, the cocking member movable between rest and toasting positions;
a second biasing member that biases the cocking member toward the rest position;
wherein the carriage includes a member that engages the cocking member, such that lowering of the carriage drives the cocking member to the toasting position;
wherein the cocking member drives the damper assembly to the activated position as the cocking member moves from the rest position to the toasting position, but wherein the cocking member is free to return to the rest position independently of the damper assembly; and
wherein the toaster further comprises an electrical switch connected with the electrical system positioned and configured to engage an electrical contact when the damper member is in the activated position and to disengage from the electrical contact when the damper member is in the deactivated position.

12. The toaster defined in claim 11, wherein raising of the carriage raises the carriage member to release the cocking member and enable the cocking member to return to the rest position independently of the damper arm.

13. The toaster defined in claim 12, further comprising a push pawl engaging and moveable with the cocking member and positioned between the damper member and the frame, the push pawl engaging the damper member to drive the damper member from the deactivated position to the activated position as the cocking lever moves from the rest position to the toasting position.

14. The toaster defined in claim 13, wherein the frame includes a vertical wall having a recess, and wherein the push pawl includes a main body and a finger, the main body being received in the recess in the vertical wall, and wherein the finger engages the damper member as the cocking member drives the damper member from the deactivated position to the activated position.

15. The toaster defined in claim 14, wherein the recess includes a cammed edge that forces the push pawl to rotate relative to the cocking member so that the finger disengages from the damper member as the damper member approaches the activated position.

16. The toaster defined in claim 15, wherein the first biasing member comprises a spring mounted to the frame and to the damper member.

17. The toaster defined in claim 11, wherein the second biasing member comprises a spring mounted to the frame and to the cocking member.

18. The toaster defined in claim 11, wherein the switch is a leaf switch mounted to the frame.

19. The toaster defined in claim 11, wherein the damper unit engagement member and the rotor include engagement features that enable the engagement member to rotate relative to the rotor in a first rotative direction but substantially prevent rotation relative to the rotor in a second, opposite rotative direction.

20. A toaster, comprising:
a housing with at least one bread slot;
a heating element positioned within the housing to toast bread in the at least one bread slot;
an electrical system connected with the heating element;
a bread-lifting carriage mounted to the housing; and
a shut-off mechanism, comprising:
a frame;
a rotary damper assembly pivotally mounted relative the frame that includes a damper member and a damper unit including (a) a cavity in which a viscous fluid is stored, (b) a rotary member that resides partially in the cavity and partially outside of the cavity, the viscous fluid resisting rotation of the rotor relative to the cavity, and (c) a pinion selectively rotatable relative to the rotary member that engages teeth in the frame, wherein the damper member is movable between a deactivated position and an activated position relative to the frame;
a first spring that biases the damper arm toward the deactivated position;
a cocking lever mounted to the frame, the cocking lever movable between rest and toasting positions; and
a second spring that biases the cocking lever toward the rest position;
wherein the carriage includes a member that engages the cocking lever, such that lowering of the carriage drives the cocking lever to the toasting position;
wherein the cocking lever drives the damper assembly to the activated position as the cocking lever moves from the rest position to the toasting position, but wherein the cocking lever is free to return to the rest position independently of the damper assembly; and
wherein the toaster further comprises an electrical switch connected with the electrical system positioned and configured to engage an electrical contact when the damper member is in the activated position and to disengage from the electrical contact when the damper member is in the deactivated position.

\* \* \* \* \*